Figure 1:
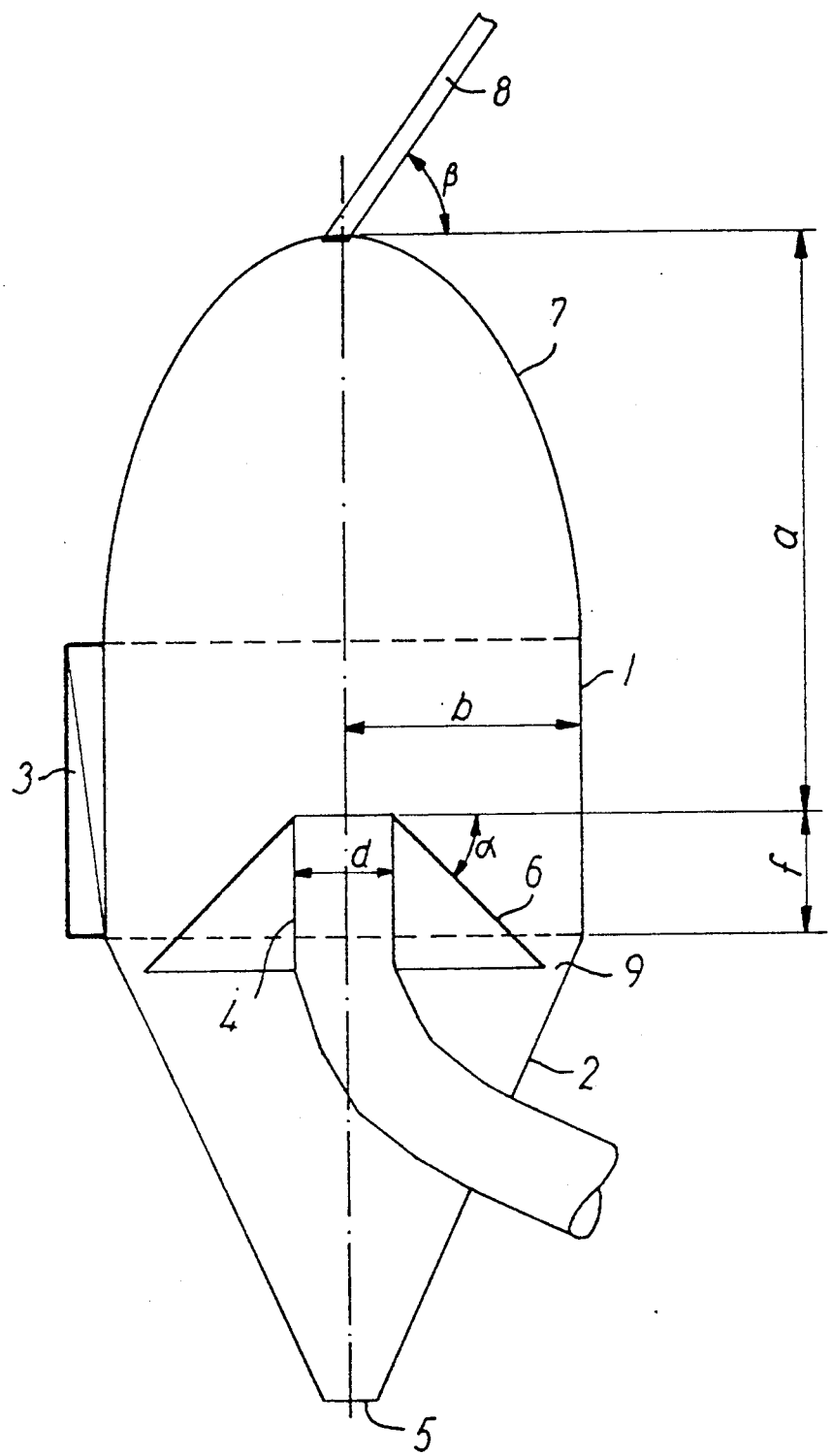

United States Patent [19]

Andreasen

[11] Patent Number: 5,131,462
[45] Date of Patent: Jul. 21, 1992

[54] HEAT EXCHANGER

[75] Inventor: Ole Andreasen, Copenhagen, Denmark

[73] Assignee: F. L. Smidth & Co. A/S, Denmark

[21] Appl. No.: 571,636

[22] PCT Filed: Feb. 9, 1989

[86] PCT No.: PCT/DK89/00024
§ 371 Date: Jan. 7, 1991
§ 102(e) Date: Jan. 7, 1991

[87] PCT Pub. No.: WO89/08813
PCT Pub. Date: Sep. 21, 1989

[30] Foreign Application Priority Data
Mar. 8, 1988 [DK] Denmark ............................ 1241/88

[51] Int. Cl.⁵ .................................................. F28C 3/14
[52] U.S. Cl. ......................................... 165/111; 432/16;
55/459.1; 55/459.2
[58] Field of Search ................ 165/111, 119; 55/459.1,
55/459.2; 34/85; 110/244; 432/16

[56] References Cited

U.S. PATENT DOCUMENTS

| | | | |
|---|---|---|---|
| 2,797,077 | 6/1957 | Müller | 34/85 X |
| 3,146,998 | 9/1964 | Golücke et al. | 432/16 |
| 3,265,775 | 8/1966 | Friedrich | 432/16 |
| 3,848,550 | 11/1974 | Bowen | 110/244 |
| 4,221,655 | 9/1980 | Nakayama et al. | 209/211 |
| 4,394,138 | 8/1983 | Schilling | 55/1 |

FOREIGN PATENT DOCUMENTS 273475 7/1927 United Kingdom ............... 55/459.2

Primary Examiner—Allen J. Flanigan
Attorney, Agent, or Firm—Brumbaugh, Graves, Donohue & Raymond

[57] ABSTRACT

A heat exchanger in the form of a vessel for heat exchange of a pulverulent solid material and a gas, e.g. for preheating raw materials prior to a burning process by use of the hot exit gases fed to the vessel consists of a hollow cylindrical central part (1) with a tangential gas inlet (3), a conical base (2) with a material outlet (5), and a downwardly orientated gas out (4), a concave upper part (7, 7') facing the central part and with at least one material inlet (8); the downwardly orientated gas outlet (4) is mounted initially axially as a central pipe inside the vessel and is provided with a skirt (6); the height of the upper part, the distance of the material inlet from the vertical axis of the heat exchanger and the inclination of the inlet to the horizontal plane, the height of the central pipe gas inlet (4) above the lower end level of the central part 91) of the vessel and the inclination of the skirt (6) are all dimensioned so as to provide optimum conditions, partly for heat exchange in radial countercurrent between material and gas, partly for separation of material from gas inside the vessel due to the downwardly orientated axial and tangential gas velocities.

1 Claim, 3 Drawing Sheets

HEAT EXCHANGER

The present invention relates to a heat exchanger of the type used for obtaining heat exchange of a pulverulent solid material and a gas. Such heat exchangers are used e.g. for preheating mineral raw material which is subsequently subjected to a burning process; the preheating being effected by use of the hot exit gases from the burning process.

Preheating of the pulverulent solid material may be carried out in a cyclone system consisting of several cylindric cyclones having a vertical or horizontal main axis and a conical bottom ending in an outlet for the solid material as it is known from e.g. chapter 20 of Duda: Cement-Data-Book, volume 1, ed. 3 (1985), Bauverlag GmBH, Wiesbaden und Berlin.

Prior art cyclones having a vertical axis are generally delimited at the top by a circular top plate or a circular opening in a downwards concave cyclone top part. A gas outlet pipe or a "central pipe" may extend through the plate or opening down into the cyclone cylinder. Solid material suspended in gas is supplied tangentially via a suspension inlet into the cylinder. Owing to the circulating movement of the gas therein the solid material is flung towards the vessel wall by the centrifugal force where it is stopped or subsequently slides down the wall onto the conical bottom and out through the material outlet while the gas leaves the vessel through the central pipe. Such cyclones are disclosed in i.a. patents Nos. FR 736.458, DE 1,913,305; SE 221,971; U.S. Pat. No. 3,740,865; U.S. Pat. No. 4,245,981, and DE 1,286,696. When used for heat exchange purposes, the heat exchange in cyclones of this type is effected counter-currently or co-currently in that the material during the heat exchange is circulated together with the gas flow in the cyclone. In order for the material to obtain the temperature desired for preheating prior to a burning process it is generally necessary to employ a plurality of such heat exchangers in series, typically four or five stages for preheating of e.g. cement raw material, thus causing this part of a kiln plant to have a considerable height of construction demanding an equally considerable consumption of construction materials.

In case of counter-current heat exchange, as it is known from i.a. GB-A-988,284 or from DK patent application No. 1600/85, the centripetal travelling direction of the tangentially introduced gas is used counter to the centrifugal travelling direction of the material introduced into a cyclone having a horizontal axis and close to this axis in order to obtain an increased heat exchange effect as compared to cyclones having a vertical axis, and the use of horizontal counter-current cyclones in preheaters may contribute to delimit the construction height of the preheater. Horizontal cyclones, however, suffer from the drawback that, typically, their separation rates are smaller than those of conventional cyclones.

Therefore, it is an object of the present invention to provide a heat exchanger having a vertical main axis and operating according to the counter-current principle and which heat exchanger is sufficiently efficient as to heat exchange as well as to material separation to replace at least two of the hitherto used stages of a cyclone preheater and which thus offers constructional advantages similar to those of heat exchangers with a horizontal main axis.

According to the invention this object is achieved by a heat exchanger comprising a cylindrical central part having a downward tapering conical base, a concave upper part facing the central part and constituting the upper delimitation of the heat exchanger, a tangential gas inlet in the wall of the cylindric part, and an at least initially axially mounted gas outlet or central pipe said inlet and outlet contributing jointly to form a spiral gas flow inside the vessel, a heat resistant skirt mounted at the upper end of the gas outlet pipe and inclining downwardly at a given angle with the horrizontal plane, at least one material inlet mounted in the upper part of the vessel, and a material outlet at the lower part of the base; the material inlet and outlet being placed so as to impart to the pulverulent solid material introduced into the heat exchanger a centrifugal momentum thereby conveying the material, while heat exchanging with the gas, through the heat exchanger counter-currently to the gas which moves centripetally towards the gas outlet pipe; and the axially mounted gas outlet being downwardly orientated pipe which extends from its at least initially central position inside the vessel down through the conical base; and which heat exchanger is characterized in that it is provided with at least one material inlet in the top of the concave upper part at a distance in the horizontal plane from the cyclone axis of up to 1.5 times the diameter of the gas outlet pipe and has an inclination to the horrizontal plane of less than 90° C. in the gas flow direction. This gas flow forms a radial centrally orientated potential vortex from the gas inlet to the central pipe, and therefore the material is introduced close to the centre of said vortex thus causing in radial direction a counter-current movement of material and gas to the material particles, which having a far higher density than the gas are being flung towards the vessel wall by the centrifugal force. The opening of the above material inlet join into the wall proper of the concave upper part in such a way that the inlet duct is inclined in the same direction as the travelling direction for the spiral gas flow inside the vessel with an inclination $\beta$ to the horizontal plane less than 90° C.

The heat exchanger according to the invention may further have a shortened conical base which together with the underside of the skirt and the gas outlet pipe constitute the lower delimitation of the vessel thus ensuring that a substantial reduction of the height of the heat exchanger. In that case the annular slit between the skirt and the conical base part conveys the separated material to an aerated trough conveyor for hot material.

Yet another feature of the heat exchanger according to the invention is the radius b of the central part is comprises within the range $1.5d \leq b \leq 3.0D$, where d is the diameter of the gas outlet pipe; and in that the distance a between the upper end of the gas outlet pipe and the top of the upper part of the heat exchanger is within the range $2d \leq a \leq 5d$.

The gas outlet pipe or central pipe of the heat exchanger is in a known way mounted so that the upper inlet end of the pipe inside the heat exchanger is placed at a distance of from 0 to 2.0 times the internal diameter of the central pipe above the lower end level of the cylindrical central part. The skirt surrounding the upper end of the gas outlet pipe may form an angle of form 40° to 70° with the horizontal plane in order to increase the heat exchange and extend towards the inner wall of the conical base so as to form an annular slit between said wall and the circumference of the skirt through which slit the separated material may pass towards a material outlet. The skirt provides more symmetrical conditions for the gas and material movements inside the heat exchange chamber, the disturbing effects upon the movement at the outlet of the central pipe through the conical part being eliminated and the skirt at the same time contributing to forcing the material towards the inner wall of the vessel into the area with the highest gas temperature.

The design of the upper heat exchanger part with the above-specified dimensions means partly that the axis of the heat exchanger becomes longer thus entailing lower radial gas velocities inside the vessel towards the gas outlet pipe and hence decreasing the entrainment of the treated material which increases the separation rate of the heat exchanger, partly that, compared to prior art heat exchanger constructions, an improved axial material flow is obtained due to the resulting force exerted on the particles, and which is composed of centrifugal and gravitational forces, carrying the particles counter-currently to the gas flow in radial as well as axial direction.

The gas outlet pipe of the heat exchanger is likewise in a known way downwardly orientated in order to ensure optimum interaction between the axial and tangential gas velocities and extends therefore out through the conical base. Owing to the downward axial velocity which may be generated in the heat exchanger the material is sucked into and distributed in the heat exchanger and due to the tangential velocity the material is flung towards the wall of the vessel where it encounters the hottest gas and it is separated from the gas.

These two effects are adapted to each other by adjustment of the distance between the upper end of the gas outlet pipe and the top of the upper part of the heat exchanger proper.

Figure 2:
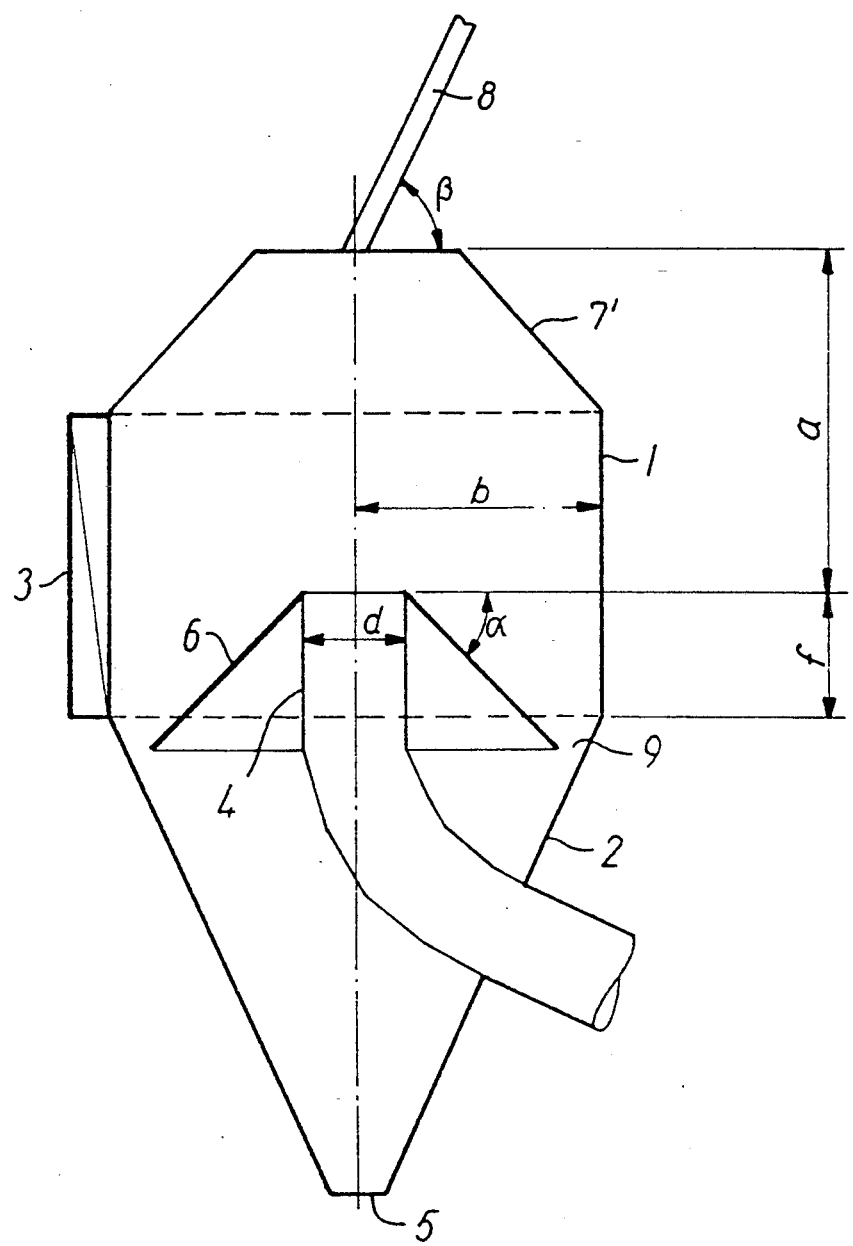
Figure 3:
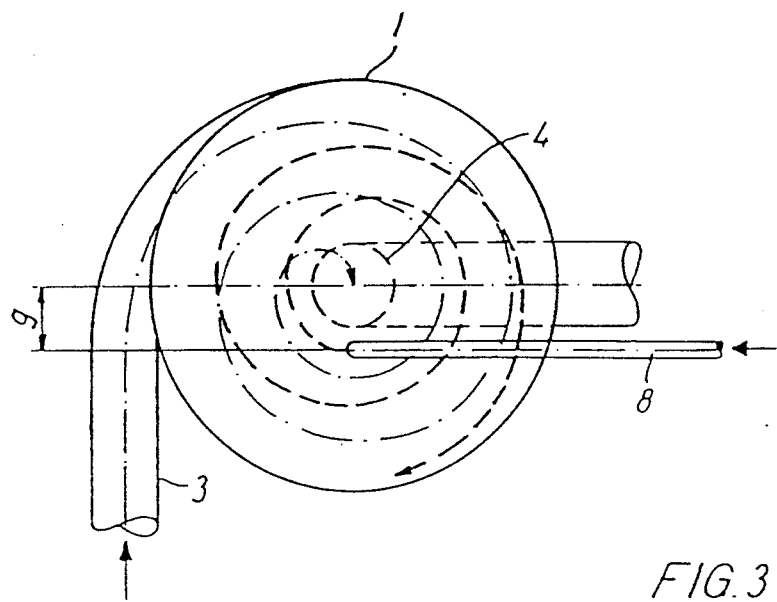
Figure 4:
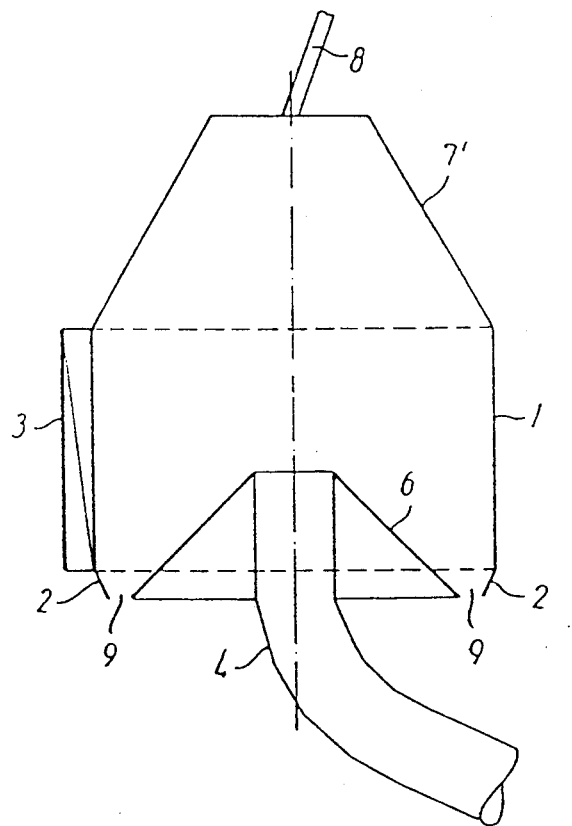

The invention is explained in more detail in the following with reference to the accompanying drawings, which are diagrammatical and illustrate non-limiting examples of embodiments and in which FIG. 1 shows a vertical axial elevation of a heat exchanger having a conical base, FIG. 2 is a vertical axial elevation of a heat exchanger having an upper part design different from the one shown in FIG. 1, FIG. 3 is the heat exchanger shown FIG. 1 seen from above, and FIG. 4 shows a heat exchanger having a shortened conical base.

The heat exchanger shown in FIGS. 1 and 2 consists of a vessel having a hollow cylindrical central part 1 with a vertical axis, a downward tapering conical base 2 having a material outlet 5, a gas inlet 3 in the wall of the central part 1 for tangential feeding of the gas into the vessel, and an upper part shaped as a concave cover 7 or 7' facing the central part. The heat exchanger shown in FIG. 1 has an ellipsoidal upper part while the one shown in FIG. 2 has a frusto-conical shaped upper part. Inside the vessel is mounted an axial gas outlet pipe or central pipe 4, which extends downwardly out through the side wall of the conical base 2. The radius b of the vessel is within the range $1.5d \leq b \leq 30d$, where d is the internal diameter of the gas outlet pipe inside the vessel. The distance a from the upper end of the gas outlet pipe 4 inside the central part 1 to the top of the upper part of the heat exchanger proper is within the range $2d \leq a \leq 5d$.

At its top the upper part has a material inlet 8. The inlet opening itself is placed at a distance g within the range $0 \leq g \leq 1.5d$ in the horizontal plane from the vertical axis of the vessel. The inlet is designed as a circular pipe which does not extend into the vessel and which forms an angle $\beta$ of less than 90° with the horizontal plane the inclination having the same direction as the travelling direction of the spiral gas flow inside the vessel. The distance g and the inclination $\beta$ contribute to the establishment of the optimum countercurrent movement in radial direction between material and gas inside the vessel. Only one of several possible material inlets at the top of the upper part is shown in the figures.

In FIG. 3 a dash-dotted arrow line indicates the movement of the tangentially introduced gas flow through the gas inlet 3 towards the axially positioned gas outlet 4 inside the central part 1 of the vessel and a dotted arrow line indicates the centrifugal movement of the added material from the material inlet 8 towards the vessel wall.

In order to create optimum gas flow velocities for the heat exchange the gas outlet or the central pipe 4 extends downwards out through the conical base 2. Also in order to ensure optimum movement conditions for gas and material inside the vessel the central pipe within the vessel is provided with a skirt 6 close to the gas inlet proper of the pie which skirt forms an angle $\alpha$ within the range $40° \leq \alpha \leq 70°$ in relation to the horizontal and extends towards the inner wall of the conical base 2 so as to form jointly an annular slit 9 through which separated material may pass downwards to the material outlet 5. The annular slit may for instance have a width of 150 mm. When using a skirt the inlet proper of the central pipe 4 inside the vessel conveniently has a height f comprised within the range $0 \leq f \leq 2.0d$ above the lower end level of the central part of the cylindrical vessel.

The alternative embodiment for the heat exchanger according to the present invention shown in FIG. 4 and with a frusto-conical upper part 7', a material inlet 8 and a gas inlet 3, is characterized in having a considerably shortened conical base 2 so that said shortened base, the underside of the skirt 6 and the central pipe 4 constitute the lower delimitation of the heat exchanger. In this embodiment separated material pass from the annular slit 9 to a not-shown aerated trough conveyer for transportation of hot material to a subsequent treatment stage of the plant.

I claim:

1. A heat exchanger in the form of a vessel having a cylindric central part (1), a downward tapering conical base (2), a concave downwards orientated upper part (7) facing the central part and constituting the upper delimitation of the heat exchanger, a tangential gas inlet (3) in the wall of the cylindric central part and an at least initially axially mounted, downwardly oriented gas outlet (4) contributing to form a spiral gas flow inside the vessel, a heat resistant skirt (6) mounted at the upper end of the gas outlet (4) and inclining at an angle $\alpha$ of between 40° C. and 70° C. with the horrizontal plane, at least one material inlet duct (8) mounted in the upper part of the vessel, and a material outlet (5) at the lower part of the vessel; the material inlet and outlet being placed so as to impart to the pulverulent solid material introduced into the heat exchanger a centrifugal momentum thus conveying the material, while heat exchanging with gas, through the heat exchanger counter-currently to the gas which moves in a substantially horizontal direction centripetally from the gas inlet (3) towards the gas outlet pipe (4) characterized in that the opening of the material inlet duct (8) at the top of the upper part (7) joins into the wall proper of this part, the inlet duct being inclined in the same direction as the travelling direction for the spiral gas flow inside the vessel and its inclination $\beta$ to the horizontal plane being less than 90°, and the material inlet proper in the horizontal plane being at a distance g within the range $0 \leqq g \leqq 1.5d$ from the vertical axis of the heat exchanger, where d is the diameter of the gas outlet pipe (4), the conical base (2) of the chamber is shortened, the shortened conical base and the underside of the heat resistance skirt (6) forming together the annular slit (9) and jointly with the pipe (4) constituting the lower delimitation of the vessel, and the radius b of the central part (1) of the vessel is within the range $1.5d \leqq b \leqq 3.0d$, the distance a from the upper end of the gas outlet pipe (4) to the top of the upper part (7) of the heat exchanger being within the range $2d \leqq a \leqq 5d$, and the upper end of the downwardly orientated gas outlet pipe (4) extending from its at least initially axial central position inside the vessel down through the conical base (2) of same being at a distance f within the range $0 \leqq f \leqq 2.0d$ inside the cylindrical central vessel part (1) from the lower end level of said part.

* * * * *